United States Patent
Bowles et al.

[15] 3,698,843
[45] Oct. 17, 1972

[54] HIGH PRODUCTION ISOSTATIC MOLDING DEVICE

[72] Inventors: Arnold G. Bowles; Neil Follette, both of Warren, Pa.

[73] Assignee: National Forge Company, Irvine, Pa.

[22] Filed: Feb. 24, 1971

[21] Appl. No.: 118,384

[52] U.S. Cl. ............... 425/86, 425/173, 425/449, 425/432, 425/443, 425/389, 425/455, 249/134, 72/54, 264/314
[51] Int. Cl. ........................................ B28b 3/00
[58] Field of Search ......... 18/5 H, 20 C, 20 P, 20 RR, 18/20 R; 25/45

[56] References Cited

UNITED STATES PATENTS

| | | |
|---|---|---|
| 3,034,191 | 5/1962 | Schaefer et al. ........ 18/5 H UX |
| 3,193,900 | 7/1965 | Wendt .................... 18/5 H X |
| 3,244,788 | 4/1966 | Michel et al. ........... 18/20 P X |
| 3,319,292 | 5/1967 | Witkin .................... 18/5 H |
| 3,374,500 | 3/1968 | Drenning ................ 18/20 P X |
| 3,454,997 | 7/1969 | Lignon et al. .......... 18/5 H UX |
| 3,516,128 | 6/1970 | Lehner .................... 18/20 P X |
| 3,550,198 | 12/1970 | Roberts ................. 18/5 H |
| 3,557,405 | 1/1971 | Bowles .................... 18/5 H |
| 3,591,903 | 7/1971 | Bowles .................... 25/45 |

Primary Examiner—J. Howard Flint, Jr.
Attorney—Charles B. Smith

[57] ABSTRACT

A high production isostatic press comprising a revolving turntable which supports elastomeric molds, each mold resting on a closure slab. The molds are filled with compactible material from a hopper while being simultaneously vibrated. The table rotates each filled mold, in turn, beneath the open end of a cylindrical, upright isostatic press. A hydraulic ram lifts each filled mold and closure slab, one at a time, from the turntable into the press where the material is compacted by fluid pumped into the press under high pressure. The closure slab seals the open end of the press during the compacting. The ram thereafter lowers the mold with its compacted material and closure slab to the turntable. The turntable rotates the compacted material and mold to an unloading stage where the mold is lifted clear of the compact and closure slab by a set of mechanical fingers. The compact is placed upon a conveyor belt by a pair of hydraulic clamps mounted on a movable, offbearing carriage. The entire operation may be automatically or manually controlled.

12 Claims, 6 Drawing Figures

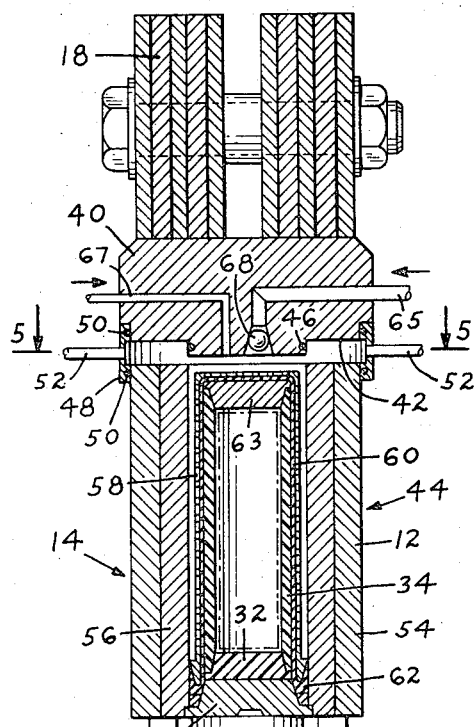
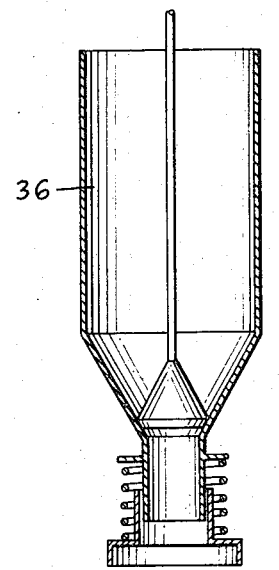
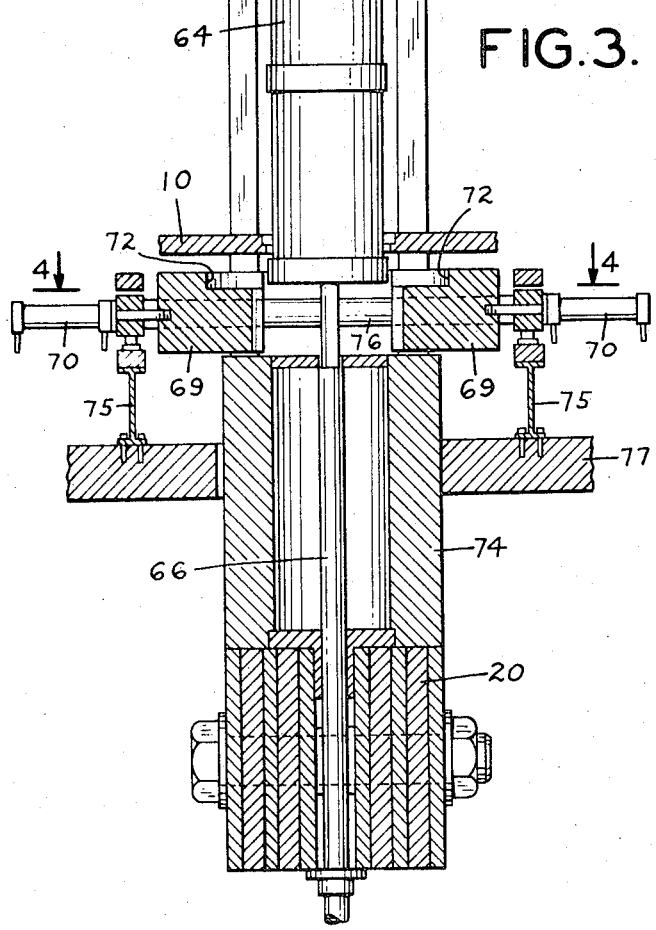
FIG. 2.
FIG. 3.

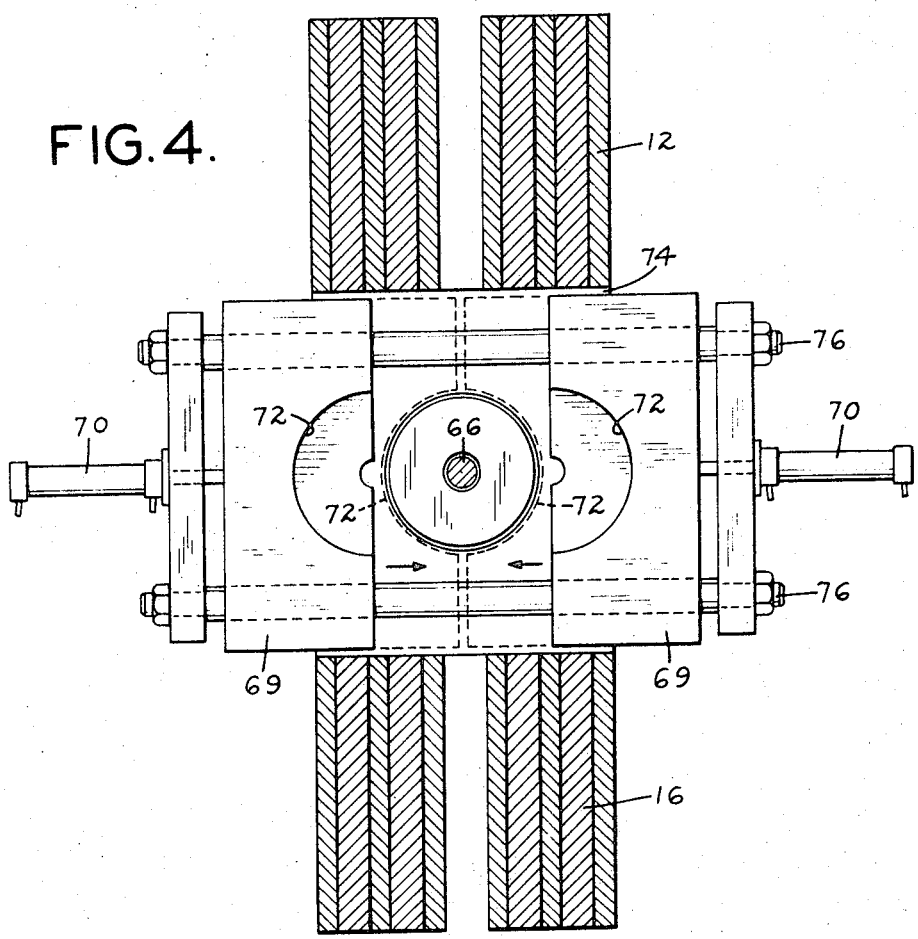
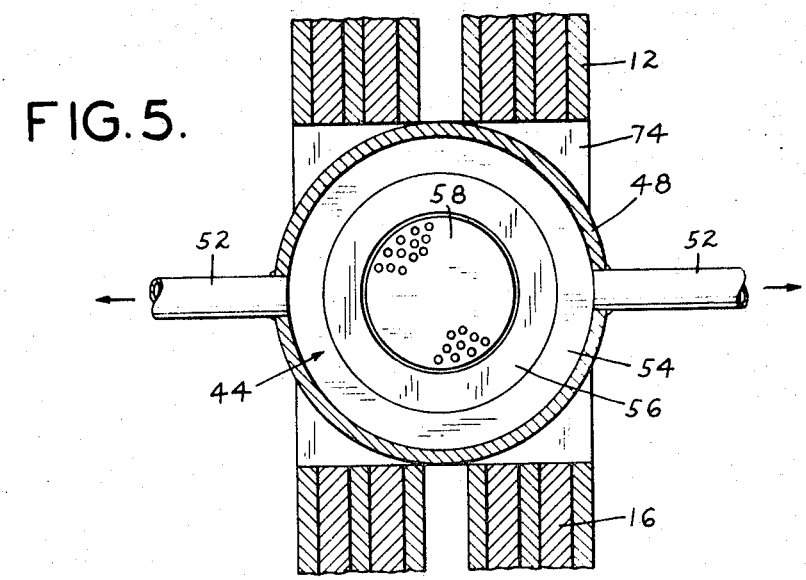

HIGH PRODUCTION ISOSTATIC MOLDING DEVICE

BACKGROUND OF THE INVENTION

The present invention relates to isostatic pressure vessels and more particularly to high production isostatic presses.

In the conventional method of isostatic pressing a molding cycle consists of filling individual molds with compressible molding material, usually in powdered form, closing and sealing these molds, placing the filled molds within a pressure vessel, closing and locking the cover of the pressure vessel, pumping fluid into the pressure vessel to the desired hydrostatic pressure, venting the pressure vessel to relieve the pressure, unlocking and opening the pressure vessel, removing the mold, pumping out some of the fluid and then emptying the molded article or compact out of the mold.

In such conventional systems the molding cycle is relatively slow. The isostatic press stands idle while the mold is being filled with, or emptied of, compact material. Is also time consuming to drain the press of fluid after the compressing cycle.

Some high production systems try to improve on the conventional method by the use of a shuttle apparatus to insert and extract the mold from the press. During a single moulding cycle in such shuttle systems the following operations take place:

1 the shuttle moves a first mold into the press, and then moves clear of the press,
2 the press is then sealed and the material compacted,
3 the press is unsealed,
4 the shuttle removes the first mold and moves clear of the press,
5 a new mold is moved into position,
6 the new mold is placed into the press by either a new shuttle or the first shuttle mechanism to begin a second molding cycle. Thus at least five steps are necessary for one complete moulding cycle.

Some pressure vessels used in prior high production presses use locking-pin or interrupted thread closures. Such pressure vessel closures have numerous inherit stress concentration factors and are therefore expensive to design and construct. Since such pressure vessels normally fail at the closure, the entire vessel must be replaced which adds to the operating expense of such systems.

SUMMARY OF THE INVENTION

The above and other disadvantages are overcome by a preferred embodiment of the present invention which comprises a turntable supporting a plurality of molds, each mold having a cylindrical section seated on a bottom plug. The molds are made of an elastomeric compound such as urethane. Each mold is supported on separate circular steel slabs resting in recesses in the table. During the pressurization step of the molding cycle these steel slabs act as the pressure vessel closure.

The turntable carrying the steel slabs and the molds is indexed to carry each mold sequentially through four stations where predetermined operations are performed by the apparatus of the invention. A given mold is first aligned under a hopper which fills the mold with a compactable material. During the filling operation the slab together with the mold being filled is lifted clear of the turntable by a vibrating or jogging mechanism which settles the compact material within the mold.

When the filling operation is complete the mold and closure slab are lowered back to the turntable which is then indexed to a second predetermined position or station where the level of the material within the mold and the weight of the mold are checked manually or automatically. The mold is also given extra jogging at this station. The turntable is next indexed to a third station placing the mold beneath an open ended, upright, high pressure, cylindrical shell mounted in the top portion of a yoke type frame. The upper end of the shell is fitted against a pressure block mounted within the yoke frame.

Within the high pressure shell is a fixed diaphragm or so called dry (rubber) bag. The mold and closure slab are lifted up into the shell and diaphragm by a hydraulic ram which extends up from beneath the turntable through the recess in the turntable. Fixed at the blind end of the diaphragm is an elastomeric plug designed to fit the open end of the mold cylinder when the mold is fully injected into the shell by the ram.

After the closure slab seals the pressure cylinder due to the force of the ram, fluid is pumped into the shell to a predetermined pressure on the outside of the diaphragm. Pressure is isostatically applied through the diaphragm in a radially inward direction to the sides and the top of the mold. The end load exerted on the ram through the closure slab by the pressurized fluid is transferred to the yoke frame through two key blocks of steel which are hydraulicly moved under the ram when it is in the full up position.

At the conclusion of the pressing operation, the key blocks beneath the ram are retracted, the fluid is depressurized and the surplus liquid is removed through an annular chamber provided at the top of the pressure cylinder at the point where the pressure block seals the upper end of the cylinder during the pressing operation. The cylinder is drained by lowering it out of engagement with the pressure block and pumping the fluid out of the vessel through the chamber. The ram is lowered to again place the closure slab and the mold on the turntable. The turntable is then indexed to a fourth station or unloading position.

In the fourth station the mold cylinder is striped from the compacted material (compact) by a pair of mechanical fingers which are lowered to grip the top of the mold cylinder and lift it clear of the compact. The mold does not bind because the compact's dimensions are now less than the mold which springs back to its original shape after the pressing.

Simultaneously with the stripping of the mold cylinder, the compact and the closure slab are lifted slightly free of the table by a hydraulic cylinder extending up from beneath the turntable. An offbearing carriage moves in over the turntable. On the offbearing carriage are two hydraulicly activated clamps which extend to grab the compact. The closure slab is then lowered back into the recess in the table and the compact is transferred by the offbearing carriage to a conveyor belt for further processing. The mold cylinder is returned to seat on its plug base and the table is indexed to place the empty mold in the filling position to restart another molding cycle.

It should be apparent that the operations at the four indexed positions of the table are continuous; there are four molding cycles operating in sequence at the same time.

A high production press according to the invention has the advantage over some conventional isostatic pressing systems of fast cycling while using only one pressure vessel because the operations of filling, jogging, checking and stripping the molds are done outside of the pressure vessel while the vessel is simultaneously pressing a given mold.

Furthermore the removal of the molds from the press is fast relative to prior high production presses involving the use of a shuttle system as described above. In the operation of the present invention only three steps are required to load and unload the molds into the press as opposed to the five steps required of the shuttle system:

1 a mold is inserted into the pressure cylinder by the ram, which simultaneously seals the pressure vessel with the slab supporting the mold, 2 after pressurization the pressure vessel is opened and the mold removed from the vessel by the single step of lowering the mold to the turntable, 3 a second mold is rotated by the turntable into position to be injected into the isostatic press while the first mold is simultaneously rotated away for stripping.

The use of a turntable and the use of a ram to inject the mold within the pressure vessel while simultaneously sealing it allows the elimination of the separate steps of inserting a carrying mechanism for the mold within the pressure vessel, extracting the mechanism, sealing the vessel and then repeating the operation to remove the compact. A saving in time is thus effected. Since a high production press according to the invention is designed to produce compacts at a rate of two per minute, this saving in time is economically significant.

A still further advantage of the present invention is that the pressure vessel can be designed as a simple cylinder, free of stress concentration effects which occur in a vessel having a locking-pin closure or an interrupted thread closure. The vessel is also relatively inexpensive to replace after failure due to fatigue. The inner portion of the pressure cylinder may be in the form of a shell which may be replaced without the necessity of replacing the outer shell.

While the above preferred embodiment has been described in terms of pressing compacts in the shape of cylindrical billets, other preferred embodiments are capable of pressing compacts of different shapes. For example, the mold could be comprised of elastomeric material in the shape of two spherical halves to produce a round compact. The elastomeric mold could be in the shape of a rectangle to produce a square or cubic compact.

In some embodiments more than one compact may be injected into the press at the same time, the only limitation being the internal diameter of the rubber diaphragm within the press. For example, small individual molds in the shape of spark plug insulators may be injected into the isostatic press several at a time.

In these other embodiments the mechanisms for stripping the molds from the compact and for filling the molds initially are modified from the above described preferred embodiment to fill and strip a pretermined number of molds at one time. It should be noted, however, that the basic apparatus, including the turntable and the press are substantially the same. Because of the isostatic pressing technique, the interior dimensions of the press itself need not be changed to accommodate different shaped compacts.

Thus it is an object of the present invention to provide a high production isostatic pressing system having a fast molding cycle while using only one pressure vessel.

It is a further object of the present invention to provide such a pressing system in which the operation of removing one mold from the press and replacing it with another mold is done in a minimum number of steps.

It is still another object of the present invention to provide a high production isostatic pressing system in which the pressure vessel is relatively free of stress concentration effects and may be inexpensively replaced.

The foregoing and other objectives, features, and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 2 is a vertical view, partly in section, of the loading station of the embodiment of FIG. 1 taken generally along the line 2—2 of FIG. 1;

FIG. 3 is a vertical view, partly in section of the isostatic press and mold injecting, hydraulic ram of the pressing station of the embodiment of FIG. 1 taken generally along the line 3—3 of FIG. 1;

FIG. 4 is a horizontal view in section taken generally along the line 4—4 of FIG. 3;

FIG. 5 is a horizontal view in section taken generally along the line 5—5 of FIG. 3;

DESCRIPTION OF CERTAIN PREFERRED EMBODIMENTS

Figure 1:
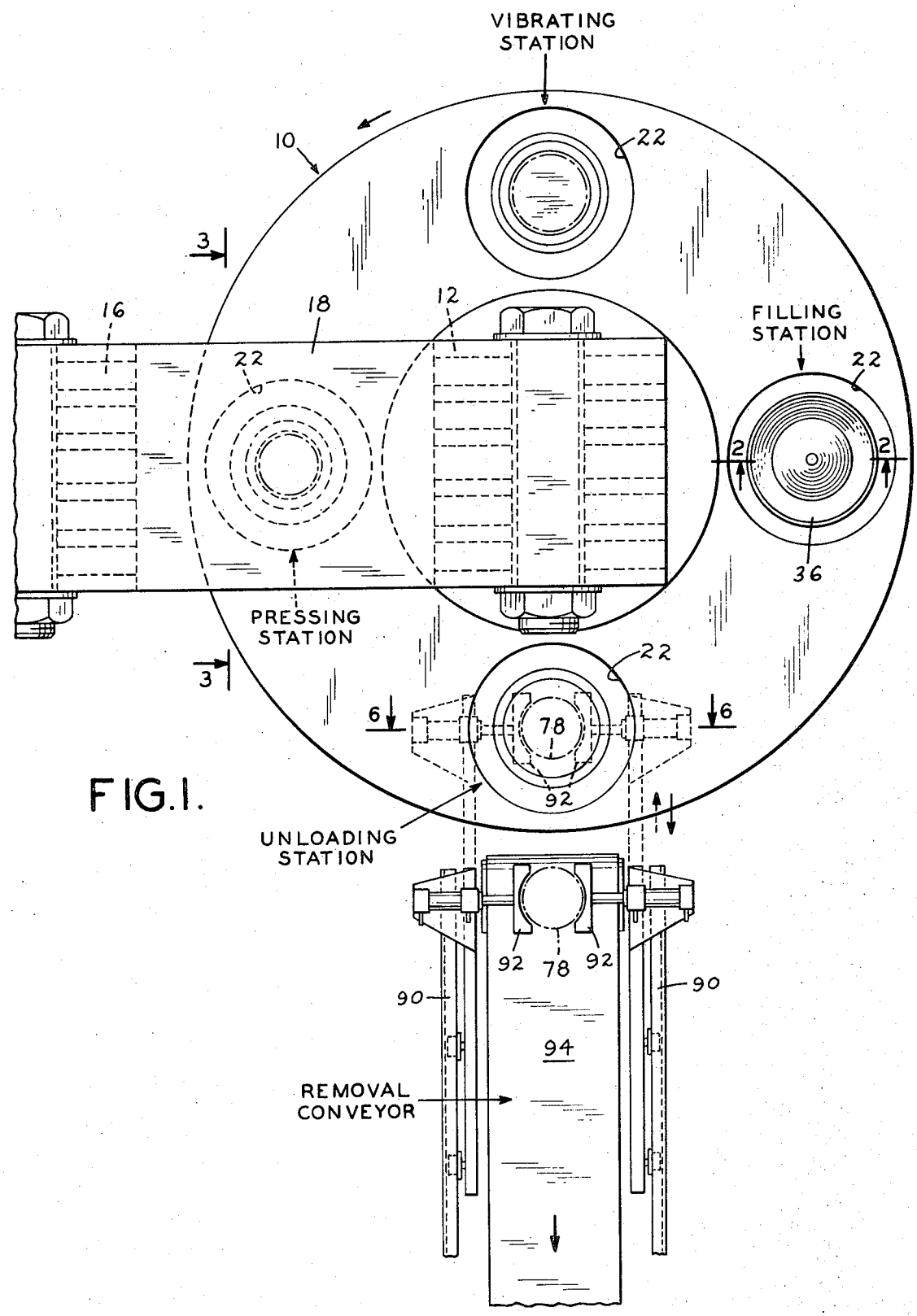
FIG. 1 is a plan view of a preferred embodiment of the invention specifically showing the turntable and unloading mechanism.

Referring now more particularly to FIGS. 1, 2 and 3 a turntable 10 is mounted for rotation about a vertical tie-member 12 of an upright, yoke type isostatic press designated generally as 14. The other vertical tie-member 16 of the press is parallel to and opposite from the tie-member 12 so that one-half of the turntable rotates between them. The tops of the tie-members 12 and 16 are joined by an upper, horizontal tie-member 18. The bottoms of the tie-members 12 and 16 are joined by lower, horizontal tie-member 20. The members 12, 16, 18 and 20 are made of laminated steel.

The turntable 10 is rotated discrete fractions of a complete revolution, counter-clockwise as viewed in FIG. 1, by a hydraulic or na electric motor-operated mechanism (not shown). The table is provided with four holes 22 evenly spaced 90 degrees apart from each other. The table rotating mechanism indexes the table such that each one of the four recesses is aligned with a separate one of four operational stations radially spaced at ninety degree intervals about the table.

A complete molding cycle and the apparatus for carrying it out will now be described with reference to a particular mold. It should be recognized, however, that three other mold cycles are simultaneously being carried out in sequence.

Seated within each turntable hole 22 is a steel closure slab 24 which is generally disc shaped and has a diametrical enlargement 26 to engage a shoulder 27 in the turntable hole, thus supporting the slab 24. The lower portion 28 of the slab projects through the hole in the turntable. The top portion 30 of the slab is in the shape of a truncated cone. (See FIGS. 2 and 6).

On top of the slab 24 rests a bottom, mold plug 32. A mold cylinder 34 is normally fitted over the plug 32. The upper portion of the mold cylinder 34 is adapted to receive a top closure plug as will be explained further below. The cylinder 34 and the bottom closure plug 32 are made of an elastomeric compound such as urethane.

At the first position or filling station of the molding cycle the mold cylinder 34 is indexed by the turntable 10 beneath a hopper 36 which is mounted in a stationery framework (not shown). The hopper is activated either manually or automatically to fill the cylinder 34 with the material to be compacted. The hopper feed mechanism is programmed to measure a predetermined amount of compact material into the cylinder. Simultaneously with the filling of the mold cylinder 34 a retractable vibrating mechanism 38 lifts the slab 24 and the mold cylinder 34 clear of the table and vibrates or jogs the cylinder to settle the powder within the cylinder and to ensure an even distribution of the compact material within the cylinder.

The turntable 10 is next indexed counter-clockwise one quarter turn to an extra vibrating and checking station. At this station a mechanism (not shown) beneath the turntable substantially identical to the retractable vibrating table 38 again lifts the mold from the turntable and vibrates the material inside to thoroughly distribute it. The filled mold cylinder 34 is also checked for weight and height either automatically or manually against predetermined standards. When a nonconforming cylinder is detected, it is removed and the turntable is advanced an extra one quarter turn.

From the checking and extra vibrating station the turntable 10 is again indexed counter-clockwise one quarter turn as viewed in FIG. 1 to the pressing station. The mold cylinder 34 and the closure slab 24 are now aligned between the vertical tie-members 12 and 16 of the isostatic press 14.

Fitted between the vertical tie-members 12 and 16 and affixed to the upper, horizontal tie-member 18 is an upper pressure block 40. At the bottom surface of the pressure block 40 is an annular shoulder 42. A high pressure cylinder 44 is slidably mounted in recesses in the vertical tie-members 12 and 16 beneath the high pressure block 40. The upper edge of the high pressure cylinder 44 is adapted to seat on the shoulder 42 during pressurization. As depicted in FIG. 3, the cylinder 44 is not seated on the shoulder 42. An O-ring seal 46 on the inside edge of the shoulder 42 prevents fluid from leaking out between the joint formed of the cylinder 44 and the high pressure block 40.

A header-ring 48 circumferentially surrounds the shoulder 42. The header-ring 48 has a cee ("C") cross-section with O-ring seals 50 at the short legs of the cee. One seal is in contact with lower exterior of the high pressure block 40 while the other seal is in contact with the upper exterior of the high pressure cylinder 44. As will be explained further below, the pressure vessel is drained of fluid by lowering the high pressure cylinder 44, thus disengaging it from the shoulder 42 of the high pressure block, and pumping the fluid out of a pair of ports 52 in the header-ring 48. (see FIG. 5).

The high pressure cylinder 44 is actually made of two concentric cylinders 54 and 56. The inner cylinder 56 is in the form of a replaceable sleeve to facilitate quick and economic repair of the press. Within the inner cylinder 56 is a perforated metal can 58 with its blind end mounted upward. Fitted within the can 58 is a rubber diaphragm 60 in the shape of an inverted bag. The diaphragm 60 has a curved reinforced lip 62 which fits over the edges of the can 58 to seal against the inner surface of the cylinder 56. An upper elastomeric mold plug 63 is mounted within the bag 60 at its blind end.

The mold cylinder 34 filled with compactable material and positioned by the turntable beneath the open end of the cylinder 56 and the diaphragm 60 is injected up into the press by a ram member 64 operated by a hydraulic piston 66 mounted in the lower horizontal tie-member 20. The upper mold plug 63 within the bag is aligned with the mold cylinder 34 and bears down on the compactable material when the mold cylinder is injected into the press.

The closure slab 24 is so dimensioned as to close the bottom of the cylinder 56 when the ram 64 is in the full up position. The upward force of the ram 64 is also applied to the bottom of the complete cylinder 44 through the closure slab 24, thereby lifting the cylinder so as to seat its top edge in the shoulder 42 of the upper pressure block. Fluid is first pumped into the sealed cylinder 44 through a low pressure line 65 in the pressure block 40. When the pressure chamber is substantially full, more fluid is pumped in through a high pressure line 67 in the pressure block 40 until a predetermined pressure is reached. The fluid pressure of such an isostatic press may be of the order of 40,000 pounds per square inch. The low pressure line 65 has a ball type check valve 68 at its point of entry to the interior of the vessel to prevent the escape of the high pressure fluid.

Before pressurization, when the ram is in the fully up position, a pair of key blocks 69 are slid beneath its bottom end by hydraulic actuators 70. The blocks 69 have recesses 72 in their top surfaces which are adapted to receive the bottom portion of the ram 64 and hold it securely. (See FIGS. 3 and 4).

Between the vertical tie-members 12 and 16 and above the bottom horizontal tie-member 20 is a bottom pressure block 74. The key blocks 69 slide on a pair of spaced-apart, parallel through-bolts 76 attached through a flexible framework 75 to the floor 77. During pressurization the end load exerted on the ram 64 by the fluid within the high pressure cylinder 56 is passed through the key blocks 69 to the lower pressure block 74 and thence to the remainder of the yoke structure through the bottom horizontal tie-member 20.

After the pressurization step is completed the press 14 is initially depressurized by opening a valve in the high pressure line 67. Thereafter the key blocks 69 are retracted, and the ram 64 is lowered an amount sufficient to drop the cylinder 44 a distance just short of disengagement with the lower O-ring seal 50 of the header-ring 48. This creates an annular drain gap between the top of the cylinder 44 and the bottom of the pressure block 40. The remaining fluid is rapidly sucked out of the cylinder 44 through this annular chamber and the ports 52 by an external pump (not shown). During this evacuation of the fluid from the press the rubber bag diaphragm 60 is pulled back to its original shape, free of the mold cylinder 34.

When the cylinder 44 is substantially clear of fluid the ram 64 is lowered to the fully down position, thereby reseating the closure slab 24 upon the turntable 10. The upper mold plug 63 remains with the rubber bag when the mold cylinder 34 is lowered.

Figure 6:
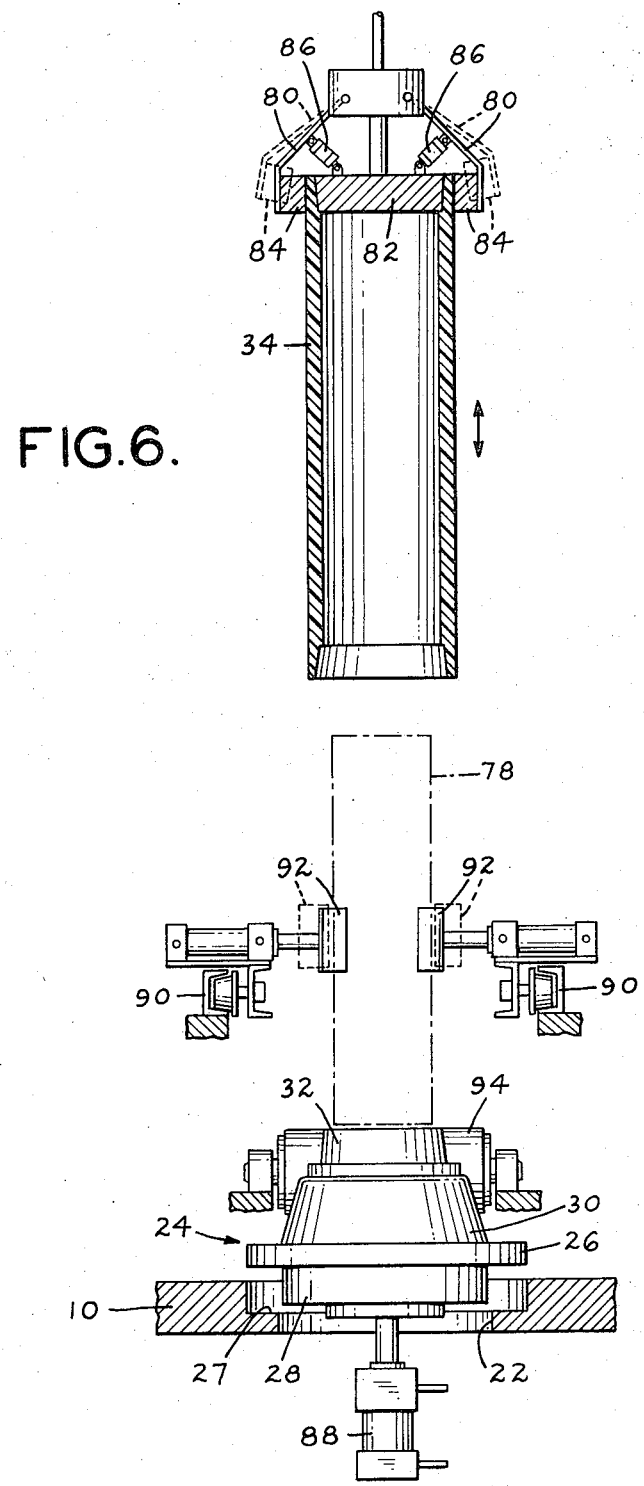
FIG. 6 is a vertical view partly in section and with portions broken away of the unloading station of the embodiment of FIG. 1 taken generally along the line 6—6 of FIG. 1 but additionally showing the unloading mechanism as it appears when extended over the turntable.

The turntable 10 is indexed 90 degrees to place the now compacted material 78 (shown in dotted line fashion for purposes of clarity) within the mold cylinder 34 at the unloading station. Referring now more particularly to FIGS. 1 and 6 a pair of mechanical fingers 80 are lowered from an overhead mechanism (not shown) to grip the top edge of the mold cylinder 34. A rigid plug member 82 affixed to the mechanism holding the fingers 80 is simultaneously fitted within the top portion of the cylinder 34 such that pads 84 at the tips of the fingers 80 grip the top edge of the mold cylinder 34 against the plug member 82. The fingers are operated by hydraulic cylinders 86 mounted between the fingers and the plug member.

When the material within the mold is compacted during pressurization its dimensions decrease geometrically with respect to the inner dimensions of the mold cylinder 34. The mold cylinder 34 being made of elastomeric material, however, springs back to its original shape after pressurization. Thus the mold cylinder does not bind with the compact 78 when it is lifted clear by the fingers 80.

While the mold is thus being stripped from the compact 78 a hydraulicly operated plunger 88 mounted beneath the turntable lifts the slab 24 with the compact slightly above the surface of the turntable. A hydraulicly operated offbearing carriage 90 mounted above the turntable simultaneously rolls into position over the turntable and extends two retractable hydraulicly operated clamps 92 mounted at its end to grip the compact between them. The plunger 88 withdraws leaving the compact 78 suspended over the turntable 10, the slab 24, and the bottom plug 32. The offbearing carriage 90 then withdraws carrying the compact to position it over a conveyor belt 94 axially aligned beneath the carriage 90 which removes the compact for further processing.

With the removal of the compact 76 the mechanical fingers 80 are again lowered with the mold cylinder 34 to reseat it upon the bottom mold plug 32 and release it. The turntable with the mold is next indexed to the filling station to begin another cycle.

In the above description various actuators and cylinders have been described as being "hydraulic." In other embodiments the actuators and cylinders could be pneumatic. The number of operational stations radially spaced about the turntable is also varied in other embodiments to include more or less than the four stations depicted in the embodiment of FIG. 1.

While the preferred embodiment of the invention has been described in reference to molding cylindrical billets, other embodiments use differently shaped molds. It is a feature of the isostatic pressing technique that the pressure vessel itself need not be altered internally, provided it has sufficient internal dimensions, to accommodate different shaped molds. The force exerted by the pressurized fluid is exerted isostatically upon the material being compacted, that is the pressure is normal to every portion of the surface of the mold.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. An isostatic molding press of the type wherein high pressure fluid compacts loose material within an elastomeric mold sealed within a pressure vessel wherein the improvement comprises rotatable support means for sequentially advancing a plurality of elastomeric molds open at one end through at least a first, a second, and a third predetermined radial positions about a common axis, means for filling each mold in turn at the first radial position with the loose material, an upright isostatic pressure vessel located at the second radial position, the pressure vessel being open-ended at its bottom, means at the second radial position for injecting each mold in turn into the pressure vessel while simultaneously sealing the open end of the pressure vessel and for extracting each mild in turn from the pressure vessel while simultaneously unsealing the pressure vessel, means for isostatically compacting the material within the sealed pressure vessel by injecting pressurized fluid into the pressure vessel, means located at the third radial position for stripping each mold in turn from the compacted material and means located at the third radial position for removing the compacted material from the rotatable support means.

2. An isostatic molding press as recited in claim 1 further comprising means located at the second radial position for vibrating each mold as it is being filled by the filling means.

3. An isostatic molding press as recited in claim 1 wherein the rotatable support means includes a turntable and means for advancing the turntable in discrete, equal fractions of a complete revolution.

4. An isostatic molding press as recited in claim 1 wherein the rotatable support means comprises a turntable having a plurality of recesses in its surface at regular circumferential intervals, and a plurality of closure slabs for supporting each mold, each closure slab being seated in a separate recess in the turntable.

5. An isostatic molding press as recited in claim 4 wherein the means for injecting and extracting molds from the pressure vessel comprises a ram which is vertically extendable from beneath the turntable through a select one of the recesses in the turntable to lift a select closure slab and mold at the second radial position into the pressure vessel and exert a sufficient force against the select closure slab to seal the open end of the pressure vessel.

6. An isostatic molding press as recited in claim 1 further comprising means within the pressure vessel for closing the open end of each mold, in turn, when injected into the pressure vessel.

7. An isostatic molding press as recited in claim 1 wherein the means for stripping the molds from the compacted material comprises a pair of movable fingers, a solid plug adapted for fitting into the open end of a select elastomeric mold, means for clamping the fingers against the edge of the opening of the select mold so as to compress the edge of the select mold between the solid plug and the fingers, vertically retractable means for lowering the fingers and the solid plug into engagement with the select mold and lifting the select mold away from the compacted material.

8. An isostatic molding press as recited in claim 1 wherein the means for removing the compacted material from the rotatable support means comprises a conveyor belt, an offbearing carriage axially aligned with the conveyor belt and extendable over the rotatable support means, and retractable clamp means mounted on the end of the offbearing carriage for gripping the compacted material free of the mold and for releasing the compacted material over the conveyor belt.

9. An isostatic molding press as recited in claim 1 wherein the upright isostatic pressure vessel comprises a yoke frame straddling a portion of the rotatable support means, an upper end block mounted in the top of the frame, the end block having a lower horizontal surface and an annular recess in the lower horizontal surface, an open ended hollow pressure cylinder vertically mounted in the frame in such a manner that the cylinder may be moved vertically between a first position with its upward end in engagement with the end block recess and a second position with its upward end spaced apart from the end block lower horizontal surface to form a drain cavity, a header ring encompassing the outer edges of both the bottom of the end block and the top of the cylinder, means for providing a fluid seal between the header ring and the end block, means for providing a fluid seal between the header ring and the cylinder, and means communicating with the drain cavity through the header ring to evacuate fluid from the drain cavity.

10. A high production isostatic molding device for compacting loose material comprising a plurality of elastomeric molds, each mold having a bottom plug member and a cylindrical member seated upon the bottom plug member, a turntable indexed to advance in discrete fractions of a complete turn to at least a filling position, a pressing position, and an unloading position, a plurality of closure slabs seated in recesses evenly spaced circumferentially about the turntable, each closure slab supporting a mold, hopper means located at the filling position for filling a select mold with loose compactable material, means at the filling position for vibrating a select closure slab supporting the select mold to settle the material within the select mold, an upright, yoke type isostatic press arranged so as to straddle a portion of the turntable at the pressing position, the press including a hollow, vertical pressure vessel open at one end and an inverted bag shaped diaphragm disposed within the open end of the pressure vessel, the blind end of the diaphragm being in the uppermost position, ram means situated beneath the turntable for extending vertically through a select recess in the turntable to lift the select closure slab with the select mold containing the loose material up into the pressure vessel while simultaneously sealing the open end of the pressure vessel with the select closure slab and for unsealing the pressure vessel while simultaneously lowering out of the pressure vessel the select closure slab with the select mold containing the material after it is compacted to reseat it in the select turntable recess, means for injecting fluid under high pressure into the pressure vessel on the side of the diaphragm opposite the mold, means located at the unloading position for stripping the select mold from the compacted material including a pair of mechanical fingers, a solid plug, a frame mounting the solid plug between the pair of fingers and means for moving the plug and fingers above the turntable in a vertical direction, and means for gripping the top of the mold cylinder between the outer edge of the plug member and the fingers, a conveyor belt located adjacent the turntable, and offbearing carriage means axially aligned with the conveyor belt to lift the compacted material off of the turntable and position it on the conveyor belt, the offbearing carriage means including clamp means mounted at the end of the offbearing carriage for grasping the compacted material.

11. A high production isostatic molding device as recited in claim 10 further comprising an elastomeric mold top plug adapted to fit the tops of the elastomeric molds, the top plug being disposed within the rubber diaphragm at its blind end and aligned such that the top plug closes the select mold cylinder as it is injected into the pressure vessel.

12. A high production isostatic molding device as recited in claim 10 comprising a turntable indexed to advance in ninety degree intervals to a filling position, a checking position, a pressing position and an unloading position, and means located at the checking position for camparing the quantity of loose material within the select mold with a predetermined standard and for providing an indication when the quantity substantially deviates from the standard.

* * * * *